United States Patent [19]

Grow

[11] 4,151,067
[45] Apr. 24, 1979

[54] METHOD AND APPARATUS FOR ACQUISITION OF SHALE OIL

[75] Inventor: Harlow B. Grow, Pacific Palisades, Calif.

[73] Assignees: Craig H. Grow, Pacific Palisades; Bruce W. Grow, El Cajon, both of Calif.; part interest to each

[21] Appl. No.: 803,666

[22] Filed: Jun. 6, 1977

[51] Int. Cl.² .................. B01D 11/02; C10G 1/04
[52] U.S. Cl. .................. 208/11 LE; 422/261; 196/14.52
[58] Field of Search .................. 208/11 LE, 11 R; 196/14.52; 23/267 C

[56] References Cited

U.S. PATENT DOCUMENTS

| 2,722,498 | 11/1955 | Morrell et al. | 208/11 LE |
| 2,907,455 | 10/1959 | Sasaki | 23/267 C |
| 3,017,342 | 1/1962 | Bulat et al. | 208/11 LE |
| 3,497,005 | 2/1970 | Pelopsky et al. | 208/11 LE |

FOREIGN PATENT DOCUMENTS 996485 9/1976 Canada .................. 208/11 LE

Primary Examiner—Herbert Levine
Attorney, Agent, or Firm—William H. Maxwell

[57] ABSTRACT

A method and apparatus for the acquisition of emulsified shale oil from oil shale, by the granulation thereof, admixing of an emulsifier (water) therewith and by the subjection of vibration (sonic) thereto for the intimate comingling of the fluid admixture inducing withdrawal of said shale oil from the particulate matter thereof, followed by separation of the emulsion from said particulate matter.

16 Claims, 1 Drawing Figure

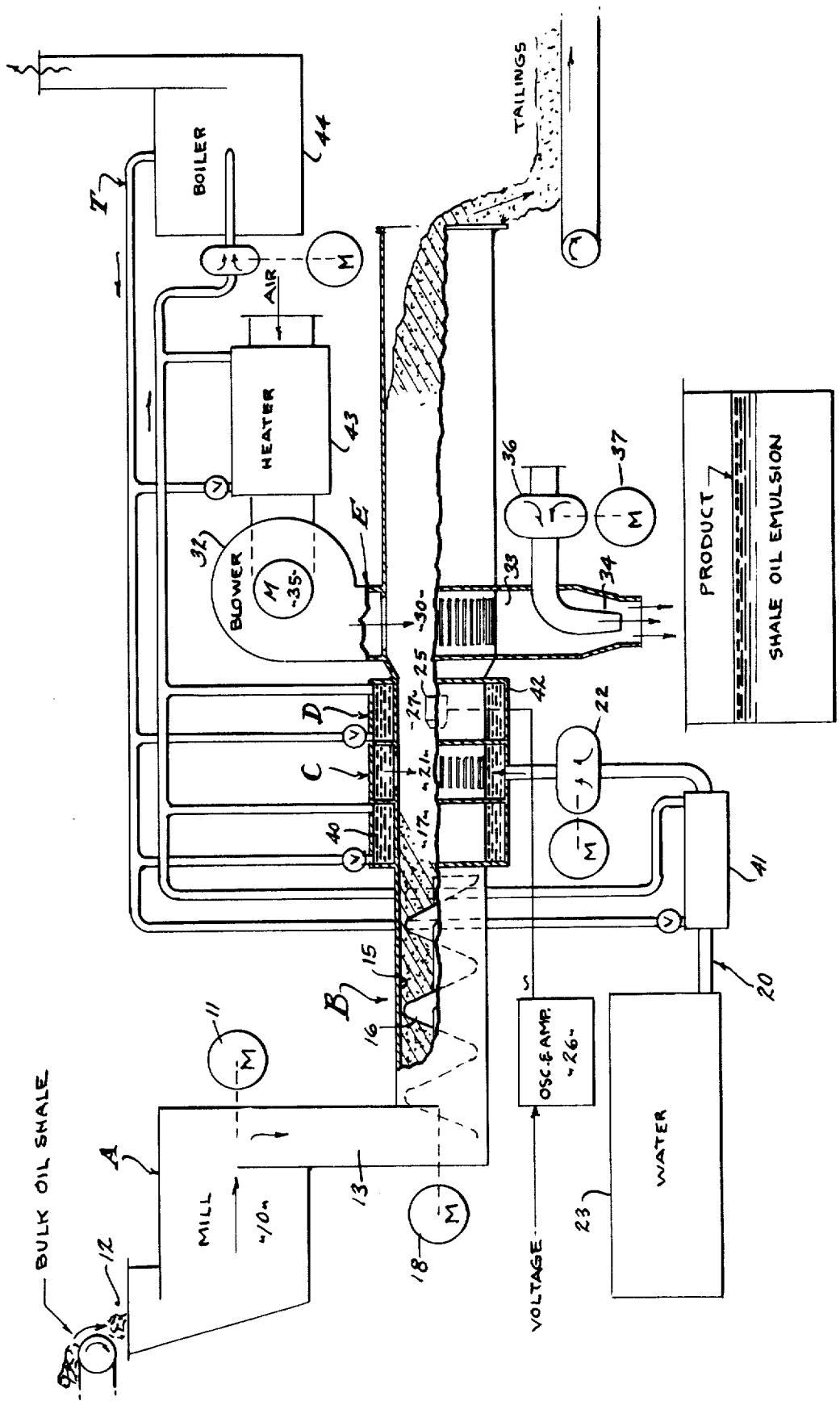

METHOD AND APPARATUS FOR ACQUISITION OF SHALE OIL

BACKGROUND

Shale oil is a natural hydrocarbon derived from shale containing bitumens or oil which can be separated therefrom. Shale is said to be clay which is on the way to becoming rock, and therefore a formation that is comparatively soft and easily broken up into flake-like pieces and readily mixed with water. There are vast reservoirs of oil bearing shales throughout the continents, akin to sandstones and the like, the rock formation thereof consisting of many varieties of sedimentary materials that split readily into plates or laminae which can then be pulverized or granulated. It is the shales and/or like oil bearing deposits with which this invention is primarily concerned.

Oil is known to be insoluble in water and remains fluid above determinable temperatures, and which can be distilled from shale to produce, for example, 30-50 gallons per ton. However, refining of oil shale by distillation methods using the application of heat and the like consumes excessive energy and has its environment pollution effect. In other words, normal "cracking" processes and the like are not economical or clean as applied to the recovery of useful hydrocarbons from oil bearing shales. However, shales are fine grained rock formed by the hardening of clay, which readily fragments into granular form for intimate exposure of the oils captured therein, it being a general object of this invention to emulsify shale oil exposed by granulation of the oil shale from which it is separated. With the present invention, the exposed shale oil is emulsified with water, providing the end product of this process to be used as such and/or separated by further refinement into fuels and plastics etc.

Pulverized or granulated oil shale is readily mixed with water to form a "slurry", by means of which the exposed shale oil and water are intimately admixed. Emulsification of the admixture in the presence of particulate shale is an object of this invention, and to this end sonic vibration is directed into the admixture of shale oil, water and particulate shale to induce the comingling of the fluids, thereby drawing the shale oil into contact with the water. In carrying out this invention, the granulated oil shale and subsequent admixture thereof with water is dynamic, a moving column thereof being subjected to sonic energy for the intimate emulsification and/or homogenization of the shale oil and water, the particulate shale remaining as separable matter.

The admixture of shale oil and water comingled with the particulate granules of shale is moved dynamically by conveyor means, in a continuous manner, it being an object of this invention to separate the emulsion of shale oil and water from the particulate oil shale from which it has been withdrawn. With the present invention, pneumatics is employed to blow the product emulsion from the particulate shale, the latter being retained by a screen so as to be discharged as "tailings" adapted to reestablish the mining sources thereof.

The fluidity of oil depends greatly upon its temperature, and to this end it is an object to maintain fluidity commensurate with comingling with water and emulsifying therewith, and further to facilitate flow of shale oil from the particulate matter, as well as to facilitate homogenization and the percolation of air (or other gas) therethrough to cause separation. In practice, the fluids both liquid and gas and particulate matter as well are tempered in order to ensure the liquidity of the shale oil as desired, and all as circumstances require.

SUMMARY OF INVENTION

This invention relates to the acquisition of shale oil from the vast known deposits thereof that remain unexploited for economic and antipollution reasons. It is the shale oil with which this invention is concerned and especially an emulsion thereof with water which is the product of this process and/or the operation of the preferred apparatus employed for carrying out said process. That is, the acquisition of shale oil is therefore a primary object of this invention, but without the use of extreme heat and expenditure of energy, resulting in pollution as heretofore practiced in distillation processes. In contradistinction, only moderate heat and energy is employed as necessary to temper the hydrocarbon constituents of the oil shale and its emulsifier, preferably water.

In carrying out this invention, the oil shale is mined and milled to a pulverized or granulated state, after which it is charged into a conveyor for compaction into a confined moving column thereof. A liquifier, preferably water, is admixed into the moving column of granulated oil shale to permeate the same. In accordance with this invention, sonic vibrations are imposed upon the admixture of shale oil and water to emulsify the same, by intimate comingling of these liquids and withdrawal of said shale oil from the particulate matter. The result is an emulsification of the insoluable hydrocarbons and water within the granulated particulate matter comprised of the rock-sand or clay, referred to herein as "slurry". The particulate matter is then separated from the emulsified fluids as by means of percolation and/or filtration stimulated by differential pressures applied to precipitate the emulsified product from the moving column of granulated material.

DRAWINGS

The various objects and features of this invention will be fully understood from the following detailed description of the typical preferred form and application thereof, throughout which description reference is made to the accompanying drawing, a schematic diagram of the method and apparatus herein disclosed.

PREFERRED EMBODIMENT

Referring now to the drawings, it is the acquisition of hydrocarbons in emulsified form which is an object of this invention, and accordingly a method and apparatus is provided therefor. Generally, the apparatus comprises in process sequence, granulating means A, conveyor means B, liquifier means C, emulsifier means D, separator means E, and tempering means T applied to one or more of the former. The apparatus operates continuously as distinguished from batch processing, and processing of the oil shale is dynamic or continuously moving. The liquification is by a discriminate admixture of water, and emulsification is by means of sonic agitation, followed by separation into the product fluids and solid tailings. The product fluids remain an emulsion of shale oil and water useful for example as one of the liquid fuels for the COMPRESSION IGNITION CONTROLLED PRESSURE HEAT ENGINE of my U.S. Pat. No. 4,070,998 issued Jan. 31, 1978, for the INTERNAL COMBUSTION ENGINE CONTROL of my U.S. Pat. No. 3,749,097 issued July 31, 1973, and for my FUEL PUMP INJECTION FOR COMPRESSION IGNITION ENGINES of my U.S. Pat. No. 3,921,599 issued Nov. 25, 1975. It is by means of fuel injectors, injecting emulsified shale oil, that controlled admixture of two liquids is discriminately injected with another liquid fuel and employed to discriminately control engine operation. The solid tailings remain as initially granulated together with clay particles and particulate matter that becomes dislodged therefrom, to be employed as a by-product, or to be returned to the mining sites for restoration of the environment from which said oil shale was previously taken.

The first step of this process is to pulverize or granulate the oil shale as it is excavated from earth deposits. The oil shale is a relatively soft rock that crushes readily into particles or granules for maximizing the exposure of its liquid content. The granulations will be to a particulate size comparable to sand, a granular size which is inherent in many oil shales. In practice, this step of the process is carried out by the granulating means A in the form of a ball mill 10 driven by a prime mover 11, which is continuously supplied with bulk oil shale at 12, and which continuously delivers pulverized or granulated oil shale at 13.

The second step of this process is to compact the granulated oil shale into a moving column. The granulated oil shale is fluid in the sense that it is capable of flowing in a conveyor, or to be moved as a column, preferably a horizontally moving mass or bed of shale as shown, in which the granules are closely related as by confinement and pressed into interengagement with each other. The compaction and/or pressed interengagement can vary in force applied, as circumstances require, confining the same in a passageway 15. In practice, this step of the process is carried out by a conveyor means B in the form of a feed screw 16 operable within the confines of a cylindrical passageway 15 receiving granulated oil shale at 13 and continuously delivering the same into a compaction chamber 17. The feed screw 16 is continuously driven by a prime mover 18, and it terminates short of the compaction chamber 17 to transport a moving column or mass of compacted oil shale granules through the chamber 17 continuation of the passageway 15.

The third step of this process is to liquify the shale oil as it moves in the confined and compacted column or mass of granulations, preferably with an admixture of water permeating the same. This liquification converts the otherwise loose granules and free shale oil into a "slurry" which pulverized shales are known to do. In practice, this step of the process is carried out by the liquification means C in the form of a pressured water supply 20 continuously injecting water into the moving column within a mixing chamber 21. The water is delivered by a pressure pump 22 from a reservoir supply 23 and into the compacted oil shale granules through the ported or screened walls of chamber 21 continuing from the chamber 17. The chambers 17 and 21 can be combined if so desired.

The fourth step of this process is to emulsify the slurry of shale oil and water as it moves in a confined column of granulations, by vibrating the same. Sonic energy is imposed upon the moving slurry to stimulate the comingling of the two involved fluids, namely the shale oil and water liquifier, to induce the withdrawal of said shale oil from the particulate granules of the oil shale bearing the same. In practice, this step of the process is carried out by the emulsifier means D in the form of a sonic transducer 25 in contact with and preferably immersed in the liquids of the slurry to be emulsified or homogenized, and a drive 26 therefor. As shown, the transducer 25 is electrically powered by an amplifier drive 26 that applied oscillatory forces to the transducer 25 causing it to impose sonic vibrations into the slurry media to stimulate the comingling of the two involved fluids. As it is shown, said transducer comprises an armature situated on and disposed to vibrate along the central axis of the emulsifier chamber 27, a continuation of the mixing chamber 21. The chambers 21 and 27 can be combined, also with chamber 17, if so desired.

The fifth step of this process is to separate the emulsified or homogenized liquids from the remaining solid particulate matter as it moves in a confined column. Enforced percolation therethrough of a secondary fluid is provided to expedite the separation, to drive out the emulsion while the solids continue to move in the column for subsequent use or disposal. In practice, this step of the process is carried out by the separator means E in the form of a secondary column of fluid such as air moving angularly with respect to the transport of the aforementioned column of particulate matter from which the emulsion is to be acquired. Accordingly, there is a separate chamber 30 continuing from the aforementioned chambers 17, 21 and/or 27, for example a widening chamber 30 that permits loosening of the particulate shale granules so as to provide opening of the interstices therebetween. The chamber walls are perforated or of screen form, and air is provided in a moving column to flow transversely, preferably in a direction aided by gravity so as to percolate through and cause precipitation of liquids from the moving column of particulate solids. As shown, the air is delivered at 31 by a blower 32 driven by a prime mover 35, and the air is exhausted at 33 by a siphon or jet pump 34 or the like delivering air from a pump 36 driven by a prime mover 37. By providing a negative syphon pressure in excess of a positive delivery pressure, the percolation is controlled so as to proceed transversely and not back-up within the advancing column of particulate matter and liquids being separated therefrom.

This process is dependent upon the fluidity factor of the shale oil to be acquired, and accordingly there is provided tempering means T at the separator means E, and at the conveyor means B, the liquifier means C and emulsifier means D, as may be required. For example, a temperature for the liquifying of shale oil, to a viscosity suitable for flow thereof, is said to be 68° F. and higher. Accordingly, the process includes the subjection of the one or more of said various steps to the application of moderate heat that will ensure said admixture, emulsification, and separation. In practice, this conditioning of said process steps is carried out by the tempering means T in the form of heat exchangers 40, 41, 42 and 43 applied to and/or embracing and surrounding the compaction chamber 17, the water supply 20 and/or its chamber 21, the chamber 27, and the separation air supply and/or its chamber 30. The heat exchangers 40–43 are supplied with heat through a fluid medium such as hot water or steam supplied from a boiler 44, and each is controlled by a valve, as shown.

From the foregoing it will be seen that I have provided a low energy method of acquiring shale oil, utilizing a minimal amount of water for liquification, and utilizing a minimal amount of heat for fluidity of the shale oil and emulsified end product thereof. The said emulsion has direct utility as hereinabove stated, or it is subject to further refinement as circumstances require.

Having described only a typical preferred form and application of my invention, I do not wish to be limited or restricted to the specific details herein set forth, but wish to reserve to myself any modifications or variations that may appear to those skilled in the art:

I claim:

1. A process for the acquisition of emulsified shale oil from oil shale, and including:

the first step of granulating the oil shale to expose its shale oil content;

the second step of compacting said granulated oil shale and exposed shale oil content and conveying the same as a confined mass through a passageway;

the third step of liquifying the exposed shale oil content in the moving mass of said granulated oil shale by admixing water therein to form a slurry thereof;

the fourth step of emulsifying the liquified shale oil content in the moving mass of said granulated oil shale by means of sonic energy applied to the passageway and the moving mass confined therein;

and the fifth step of separating the emulsified shale oil from the granulated oil shale as an end product and removing the same from the said granulations of the moving mass.

2. The process for acquiring shale oil as set forth in claim 1, wherein the said first step comprises the granulation of the oil shale to the particulate size of the clay particles of which it is composed.

3. The process for acquiring shale oil as set forth in claim 1, wherein the said fifth step comprises the separation of emulsified end product shale oil by percolating a secondary gaseous fluid transversely through the moving mass to carry the emulsified end product from the granules thereof.

4. The process for acquiring shale oil as set forth in claim 1, wherein the said fifth step comprises the separation of emulsified end product shale oil by percolating air transversely through the moving mass to carry the emulsified end product from the granules thereof.

5. The process for acquiring shale oil as set forth in claim 1, wherein heat is applied to at least one of the steps of this process to ensure fluidity of the shale oil acquired therefrom.

6. The process for acquiring shale oil as set forth in claim 1, wherein heat is applied to at least one of the steps of this process following the second step of compaction to ensure fluidity of the shale oil acquired therefrom.

7. An apparatus for the acquisition of emulsified shale oil from oil shale, and including:

granulating means for continuously pulverizing the oil shale to expose its shale oil content;

compacting and passageway conveying means receiving granulated oil shale from said granulating means and for confinement of and continuously moving a mass of said granulated oil shale and exposed shale oil content;

liquifying means receiving compacted granulated oil shale from the compacting and passageway conveying means for continuously admixing liquid into the moving mass of said exposed shale oil content in said compacting and passageway conveying means;

sonic emulsifying means receiving liquified shale oil content from said liquifying means for continuously homogenizing the same within the moving mass of said granulated oil shale;

and separating means receiving the moving granulated oil shale mass and emulsified shale oil from the emulsifying means for continuously separating said emulsified shale oil from the granulated oil shale mass as an end product and removing the same from the said granulations subsequently discharged thereby.

8. The apparatus for acquiring shale oil as set forth in claim 7, wherein the granulating means comprises a ball mill to be supplied with bulk oil shale and continuously delivering pulverized particles of said oil shale commensurate with the particulate size of the clay particles of which it is composed.

9. The apparatus for acquiring shale oil as set forth in claim 7, wherein the compacting means comprises a conveyor supplied from said granulating means and continuously charging said pulverized particles into a compacting chamber opening into said liquifying means.

10. The apparatus for acquiring shale oil as set forth in claim 7, wherein the liquifying means comprises a pressure means supplying water into the moving mass of said granulated oil shale and exposed shale oil content.

11. The apparatus for acquiring shale oil as set forth in claim 7, wherein the sonic emulsifying means comprises a vibrator means agitating the moving mass of said granulated oil shale and exposed shale oil content within the confines of a chamber following the liquifying means.

12. The apparatus for acquiring shale oil as set forth in claim 7, wherein the sonic emulsifying means comprises a transducer means immersed in and agitating the moving mass of said granulated oil shale and exposed shale oil content within the confines of a chamber following the liquification means.

13. The apparatus for acquiring shale oil as set forth in claim 7, wherein the separating means comprises a duct open into the compacting and passageway conveying means through which said moving mass of granulations and emulsion of liquified shale oil passes and with means forcing a secondary fluid transversely through the moving mass to percolate the said end product from the said granulations.

14. The apparatus for acquiring shale oil as set forth in claim 7, wherein the separating means comprises an air duct open into the compacting and passageway conveying means through which said moving mass of granulations and emulsion of liquified shale oil passes and with means forcing air as a secondary fluid transversely through the moving mass to percolate the said end product from the said granulations.

15. The apparatus for acquiring shale oil as set forth in claim 7, wherein heating means applies heat to the moving mass through at least one of the aforementioned means to ensure fluidity of the shale oil for acquisition.

16. The apparatus for acquiring shale oil as set forth in claim 7, wherein heating means applies heat to the moving mass through at least one of the aforementioned means following compaction so as to ensure fluidity of the shale oil for acquisition.

* * * * *